(12) United States Patent
Wang et al.

(10) Patent No.: US 12,306,143 B1
(45) Date of Patent: May 20, 2025

(54) TESTING DEVICE FOR A CURRENT-CARRYING FRICTION AND WEAR PERFORMANCE OF A FLEXIBLE ROLLING FRICTION PAIR

(71) Applicants: HARBIN INSTITUTE OF TECHNOLOGY, Harbin (CN); SHENYANG XINHANG WOJIN MACHINERY TECHNOLOGY CO., LTD., Shenyang (CN)

(72) Inventors: Xinwei Wang, Harbin (CN); Li Su, Shenyang (CN); Liguo Tan, Harbin (CN); Chen Liu, Harbin (CN); Bin Guo, Harbin (CN)

(73) Assignees: HARBIN INSTITUTE OF TECHNOLOGY, Harbin (CN); SHENYANG XINHANG WOJIN MACHINERY TECHNOLOGY CO., LTD., Shenyang (CN)

( * ) Notice: Subject to any disclaimer, the term of this patent is extended or adjusted under 35 U.S.C. 154(b) by 0 days.

(21) Appl. No.: 18/911,209

(22) Filed: Oct. 9, 2024

(30) Foreign Application Priority Data

Mar. 13, 2024  (CN) .......................... 202410285083.7

(51) Int. Cl.
*G01N 3/56* (2006.01)
*H01R 43/10* (2006.01)

(52) U.S. Cl.
CPC ............... *G01N 3/56* (2013.01); *H01R 43/10* (2013.01)

(58) Field of Classification Search
CPC ........................................................ G01N 3/56
USPC ................................................................ 73/7
See application file for complete search history.

(56) References Cited

FOREIGN PATENT DOCUMENTS

| CN | 102879197 A | 1/2013 |
| CN | 104155102 A | 11/2014 |
| CN | 108593536 A | * 9/2018 |
| CN | 109084981 A | 12/2018 |
| CN | 116698399 A | 9/2023 |
| CN | 117268973 A | * 12/2023 |
| WO | 2024016636 A1 | 1/2024 |

* cited by examiner

*Primary Examiner* — Laura Martin
*Assistant Examiner* — Nashmiya S Fayyaz

(57) ABSTRACT

A testing device for a current-carrying friction and wear performance of a flexible rolling friction pair, including a base plate, supporting profiles, and guiding rail sliders, and a screw assembly, and a movable supporting plate, and a fixed supporting plate, and first bearing supports, and a slider supporting plate, during the testing process, friction moment and friction force of the flexible rolling electrical contact component can be obtained by monitoring dynamic torque of rotating wheel, which is wide applicability, which allows simultaneous online monitoring of multiple experimental variables such as friction performance, current-carrying capacity, preload, friction force, and temperature; and at the same time, there is no need to adjust, assemble, or test multiple objects for the rolling ring structure; the testing process can be completed by only adjusting and testing the key electrical contact test piece, significantly simplifying the testing structure and method while reducing testing costs.

4 Claims, 4 Drawing Sheets

TESTING DEVICE FOR A CURRENT-CARRYING FRICTION AND WEAR PERFORMANCE OF A FLEXIBLE ROLLING FRICTION PAIR

CROSS REFERENCE TO RELATED APPLICATIONS

This application claims foreign priority of Chinese Patent Application No. 202410285083.7, filed on Mar. 13, 2024 in the China National Intellectual Property Administration, the disclosures of all of which are hereby incorporated by reference.

TECHNICAL FIELD

The present disclosure relates to the technical field of friction and wear testing devices, in particular to a testing device for current-carrying friction and wear performance of a flexible rolling friction pair.

BACKGROUND

The collector ring, also known as a slip ring or conductive ring, is a device that enables signal and power transmission between two rotating mechanisms which can rotate 360° relative to each other. It is one of the few single point failure components in spacecraft and is widely used in fields such as aerospace, weaponry, and medical devices.

Currently, the commonly used collector rings in space are cylindrical or disk-type sliding collector rings. These sliding collector rings primarily utilize the sliding electrical contact between brush wires and conductive columns or rings to transmit signals/power. Due to the characteristics of sliding current-carrying friction and wear, they are prone to issues such as debris accumulation, high friction torque, and increased contact resistance, which severely affect the electrical transmission performance and reliability of sliding collector rings. This has become a critical bottleneck limiting the development of high-power, long-life spacecraft.

The rolling collector ring (slip ring) has garnered attention from researchers as a highly promising electrical transmission device. It primarily consists of a conductive inner ring, a conductive outer ring, and a flexible ring. As a novel electrical transmission device, it replaces the sliding friction pair of traditional cylindrical slip rings with a rolling friction pair, reducing friction and wear. The theoretical pure rolling between the elastic ring and the inner and outer tracks minimizes material wear under ideal conditions, resulting in a longer and more reliable lifespan for this electrical contact friction pair. Additionally, the deformation of the elastic ring increases the electrical contact area between conductive components, significantly enhancing electrical contact performance. Compared to traditional sliding collector rings, rolling rings offer advantages such as long lifespan, high performance, and maintenance-free operation, making them particularly suitable for long-term operation in aerospace applications where on-site maintenance is impractical or costly.

While existing testing devices for rolling rings generally meet daily usage needs, they primarily focus on rigid rolling friction pair. However, high-power, long-life rolling rings utilize flexible rolling friction pair, which differ significantly in terms of damage modes, contact methods, and motion forms from rigid rolling friction pair. This makes it challenging to test the current-carrying friction and wear performance of flexible rolling friction pair. Moreover, most current-carrying friction testing devices focus on parameters like friction coefficient and wear rate, with limited attention to the degradation patterns of current-carrying performance, affecting the practicality of the testing devices. Therefore, designing a testing device for the current-carrying friction and wear performance of the flexible rolling friction pair is essential.

SUMMARY

The present disclosure provides a testing device for current-carrying friction and wear performance of a flexible rolling friction pair. Which aims to solve the issue that existing testing devices primarily focus on rigid rolling friction pair, while high-power, long-life rolling rings utilize flexible rolling friction pair, which differ significantly in damage modes, contact methods, and motion forms from rigid rolling friction pair. As a result, it is not possible to test the current-carrying friction and wear performance of flexible rolling friction pair. Furthermore, most current-carrying friction testing devices primarily focus on parameters such as friction coefficient and wear rate, with limited attention to the online testing of current-carrying performance degradation patterns, affecting the practicality of the testing devices. Therefore, designing a testing device for the current-carrying friction and wear performance of flexible rolling friction pair is essential.

To solve the above technical issues, this disclosure provides a testing device for a current-carrying friction and wear performance of a flexible rolling friction pair, including:

1. a base plate, supporting profiles, and guiding rail sliders, and a screw assembly, and a movable supporting plate, and a fixed supporting plate, and first bearing supports, and a slider supporting plate, and a guiding rail supporting plate, and a torque sensor mounting plate, and a motor, and a driving shaft, and a driven shaft, and a transmission belt, and a first synchronous wheel, and a second synchronous wheel, and a torque sensor body, and a coupling, and a main rotating wheel, and a driven rotating wheel, and a left mercury slip ring, and a right mercury slip ring, and a first insulating column, and a tension adjustment mechanism, and a flexible rolling electrical contact component, and an upper force sensor body, and a lower force sensor body, and an upper insulating roller, and a lower insulating roller, and a spacing adjustment mechanism, and second bearing supports, and a second insulating column; wherein, the supporting profiles are arranged on a side of a top of the base plate, and the fixed supporting plate is mounted on tops of the supporting profiles; and a side of the fixed supporting plate is fixedly connected to a motor, and an output end of the motor is equipped with a coupling; and an end of the coupling is fixed to the driving shaft, which is rotatably connected to the first bearing supports via bearings; and an end of the driving shaft (12) near the coupling is fitted with the first synchronous wheel, while another end of the driving shaft away from the coupling is equipped with the first insulating column, the left mercury slip ring, and the main rotating wheel respectively, with the left mercury slip ring located between the first insulating column and the main rotating wheel; and the screw assembly is installed on another side of the top of the base plate, which is fixedly connected to the movable supporting plate; and the second bearing supports are symmetrically provided on a top of the movable supporting plate, through which the driven shaft is connected via bearings; and an end of the driven shaft is fitted with the second synchronous wheel, which is connected to the first synchronous wheel via the transmission belt; and the torque sensor body is mounted on the driven shaft, while another end of the driven shaft is provided with the second insulating column, the right mercury slip ring, and the driven rotating wheel respectively, with the right mercury slip ring is positioned between the second insulating column and the driven rotating wheel; and the flexible rolling electrical contact component is provided between the driven rotating wheel and the main rotating wheel.

Furthermore, the first bearing supports are symmetrically installed on the top of the fixed supporting plate.

Furthermore, the torque sensor body is secured on the torque sensor mounting plate, and the torque sensor mounting plate is installed on the top of the movable supporting plate.

Furthermore, a top of the fixed supporting plate is provided with the slider supporting plate, a top of the slider supporting plate is provided with the tension adjustment mechanism, and the tension adjustment mechanism is connected to the transmission belt.

Furthermore, and a bottom of the movable supporting plate is equipped with the guiding rail sliders, which is connected to sliding rails on the top of the base plate for sliding movement.

Furthermore, the guiding rail supporting plate is provided on the top of the fixed supporting plate, and the spacing adjustment mechanism is provided on the guiding rail supporting plate; and a top of a side of the spacing adjustment mechanism is fitted with the upper force sensor body, with the upper insulating roller located at a bottom of the upper force sensor body; and a bottom of another side of the spacing adjustment mechanism houses the lower force sensor body, and the lower force sensor body is equipped with the lower insulating roller.

Furthermore, the lower insulating roller and the upper insulating roller are both rolling-connected to the flexible rolling electrical contact component.

The disclosure provides the testing device for the current-carrying friction and wear performance of the flexible rolling friction pair, which has the following advantages:

a whole supporting part consists of a base plate, a movable supporting plate, a fixed supporting plate, and a screw assembly, the screw assembly allows the movable supporting plate to move relative to the fixed supporting plate to adjust the spacing between them; and a transmission part includes a motor, a driving shaft, a driven shaft, a belt, and a tension adjustment mechanism. The driving shaft is fixed to the fixed supporting plate, and the motor drives it to rotate uniformly, which in turn drives the driven shaft to rotate uniformly at the same speed and direction, realizing transmission with different spacing, and enabling continuous adjustment of the shaft spacing; and a flexible rolling friction current-carrying circuit of the device includes a power source, a main rotating wheel, a driven rotating wheel, an insulation structure, a left mercury slip ring, and a right mercury slip ring, and a flexible rolling electrical contact; and positive and negative poles the power source are connected to the left mercury slip ring and the right mercury slip ring, respectively, thus creating a current loop through the main rotating wheel, the driven rotating wheel and the flexible rolling electrical contact component, with a circumferential of the main rotating wheel and the driven rotating wheel forms a groove track structure that confines the flexible rolling electrical contact component within the groove track structure; and a insulation structure electrically isolates the circuit components from other device parts to prevent damage or personnel hazards; and the upper force sensor body and lower force sensor body are contacted with an upper circumference and a lower circumference of the flexible rolling electrical contact component through insulated an upper insulating roller and lower insulating roller, respectively, and the spacing between the upper force sensor body and lower force sensor body can be adjusted based on a size of the flexible rolling electrical contact component; the adjustment through the spacing adjustment mechanism, primarily for online monitoring of a preload of the flexible rolling electrical contact component, and different preload can be achieved by continuously adjusting an axial spacing to change a compression amount of the flexible rolling electrical contact component; and during the use of testing device, voltage terminals of the contact resistance measurement device connects to stator ends of the left mercury slip ring and the right mercury slip ring, and a current distributor is incorporated into the current-carrying circuit, and the current distributor is connected to the current measuring end of the contact resistance measuring instrument; and a torque measurement assembly includes a torque sensor body and connecting structures located on right and left sides, after installation, the dynamic torque sensor body is fixed on the moving support plate, and its input and output ends are respectively connected to the driven shaft and the driven rotating wheel; and during the testing process, friction moment and friction force of the flexible rolling electrical contact component can be obtained by monitoring dynamic torque of rotating wheel, which is wide applicability, which allows simultaneous online monitoring of multiple experimental variables such as friction performance, current-carrying capacity, preload, friction force, and temperature; and at the same time, there is no need to adjust, assemble, or test multiple objects for the rolling ring structure; the testing process can be completed by only adjusting and testing the key electrical contact test piece, significantly simplifying the testing structure and method while reducing testing costs.

BRIEF DESCRIPTION OF THE DRAWINGS

To clarify the technical solutions in the embodiments of this disclosure or existing technology, the following is a brief introduction to the accompanying drawings used in the description of the embodiments or prior arts. Clearly, the figures described below illustrate some embodiments of this disclosure, and those skilled in the art can derive additional figures based on these without requiring creative effort.

In the figures.

1, base plate; 2, supporting profile; 3, guiding rail slider; 4, screw assembly; 5, movable supporting plate; 6, fixed supporting plate; 7, first bearing seat; 8, slider supporting plate; 9, rail supporting plate; 10, torque sensor fixing plate; 101, sliding rails; 11, motor; 12, driving shaft; 13, driven shaft; 14, transmission belt; 15, first synchronous wheel; 16, second synchronous wheel; 17, torque sensor body; 18, coupling; 19, main rotating wheel; 20, driven rotating wheel; 21, left mercury slip ring; 22, right mercury slip ring; 23, first insulating column; 24, tension adjustment mechanism; 25, flexible rolling electrical contact component; 26, upper force sensor body; 27, lower force sensor body; 28, upper insulating roller; 29, lower insulating roller; 30, spacing adjustment mechanism; 31, second bearing seat; 33, second insulating column.

DETAILED DESCRIPTION OF THE EMBODIMENTS

To clarify the objectives, technical solutions, and advantages of the embodiments of this disclosure, the following description will provide a clear and complete account of the technical solutions in the embodiments, referencing the accompanying figures. It is evident that the described embodiments are part of the disclosure and not all possible embodiments. All other embodiments derived by those skilled in the art without requiring creative effort based on the embodiments in this disclosure fall within the protection scope of this disclosure.

In the description of this disclosure, it should be noted that unless otherwise specified, the terms "install", "connected", and "coupled" should be understood broadly. They may refer to fixed connections, detachable connections, or integral connections; they can be mechanical or electrical connections; they can be direct or indirect through intermediaries, and may involve internal communication between two components. Those skilled in the art will understand the specific meanings of these terms within the context of this disclosure.

Figure 1:
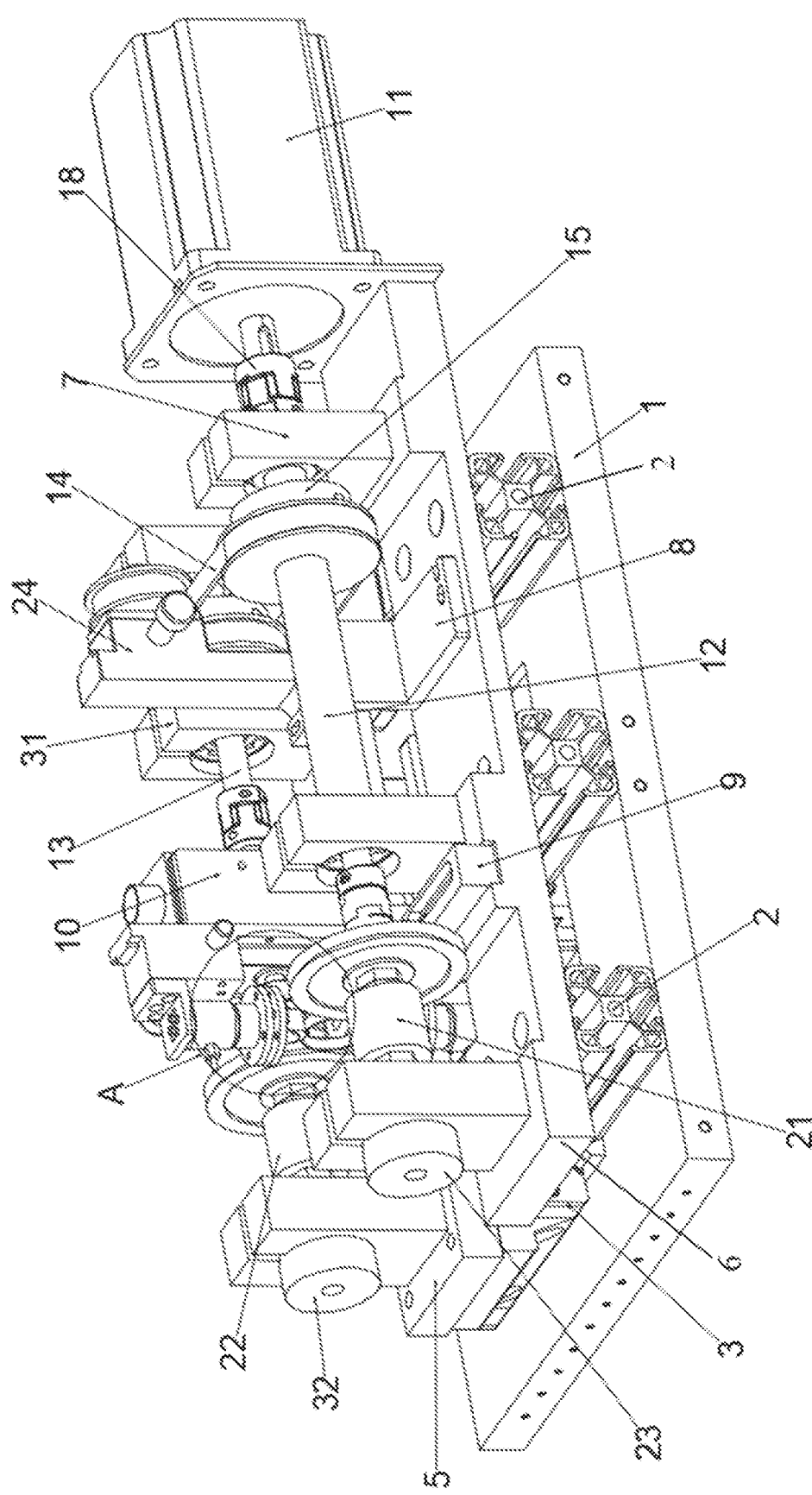
FIG. 1 is a three-dimensional diagram of the overall structure a testing device for current-carrying friction and wear performance of a flexible rolling friction pair of the disclosure.
Figure 2:
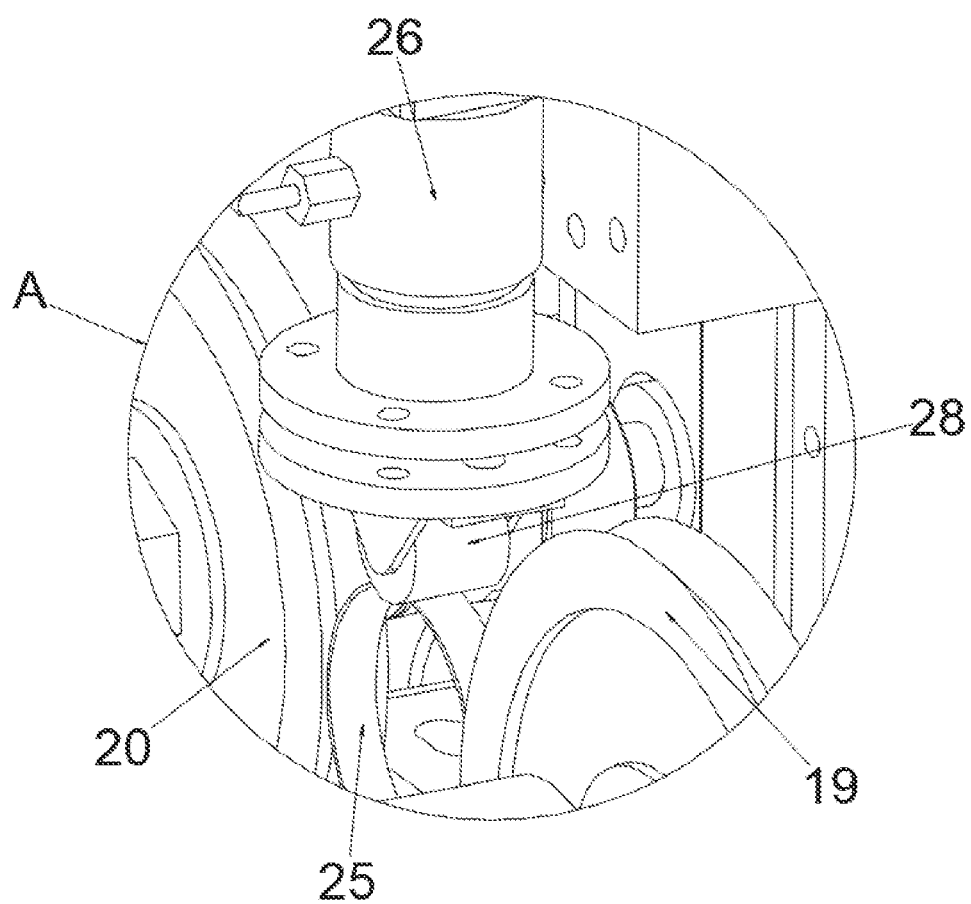
FIG. 2 is an enlarged view of an area A of FIG. 1.
Figure 3:
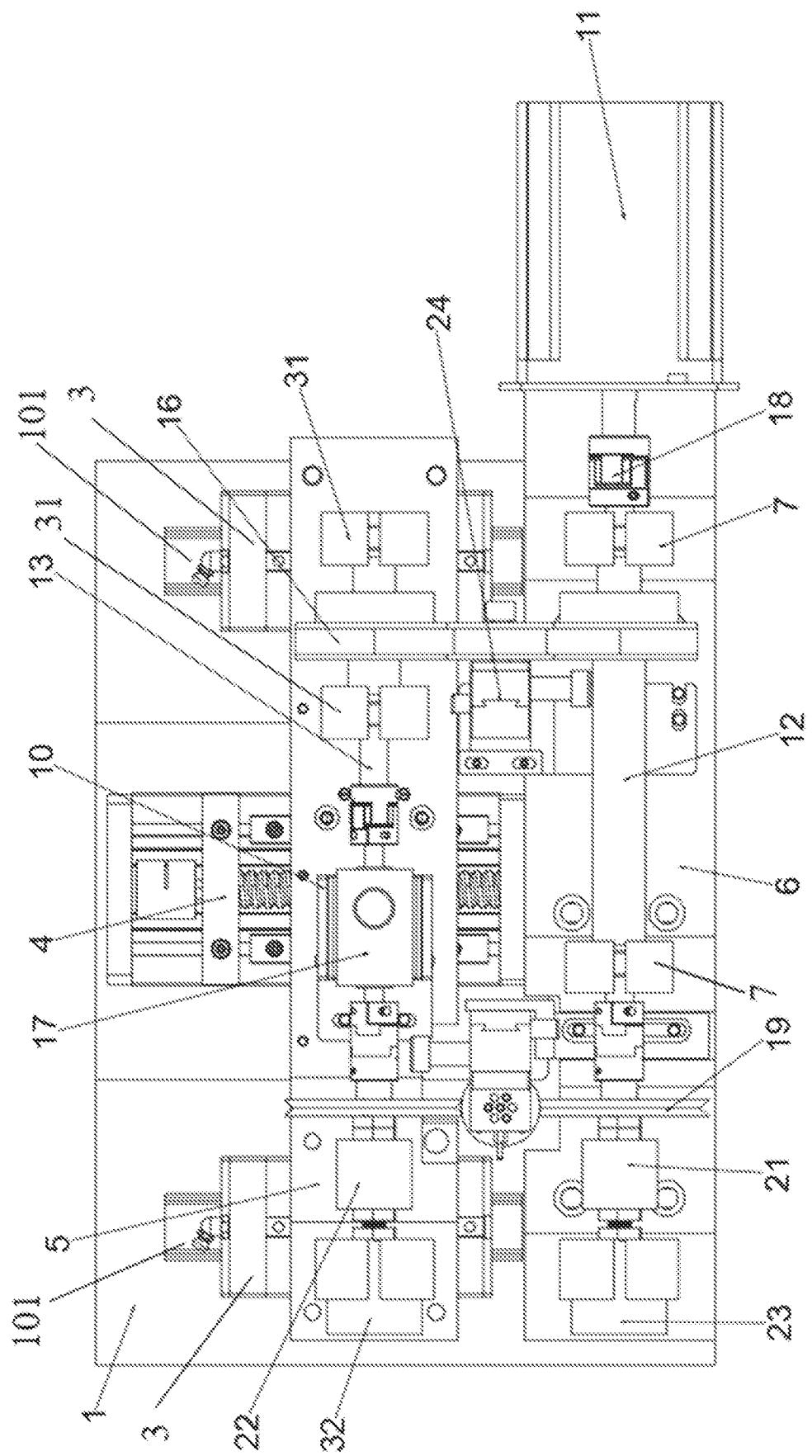
FIG. 3 is a top view thereof.
Figure 4:
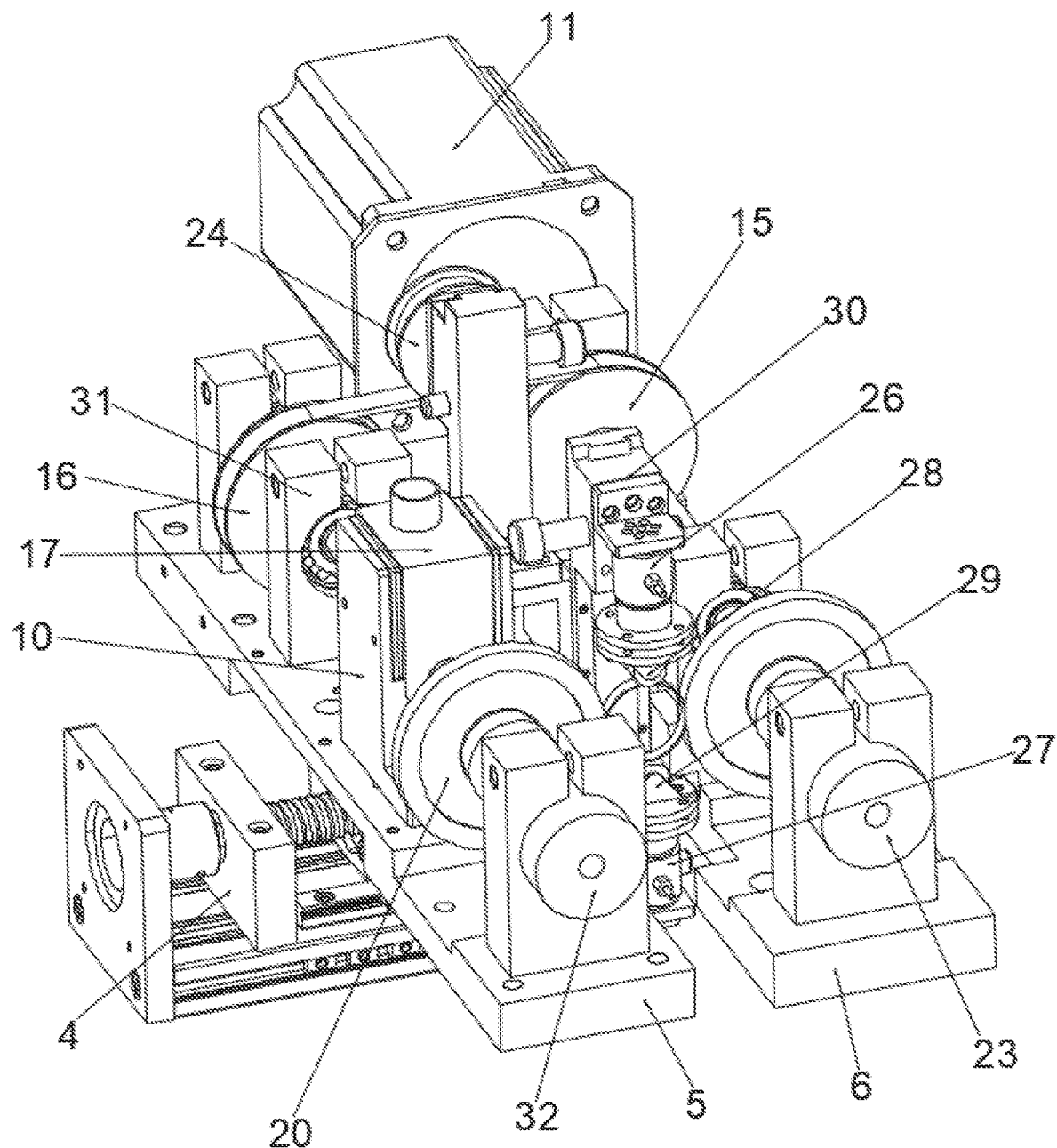
FIG. 4 is a three-dimensional diagram of a part of the structure of the testing device for the current-carrying friction and wear performance of the flexible rolling friction pair.

Refer to FIGS. 1-4, in an embodiment of the present disclosure, a testing device for current-carrying friction and wear performance of a flexible rolling contact pair includes a base plate 1, supporting profiles 2, a guiding rail block 3, a screw assembly 4, a movable supporting plate 5, a fixed supporting plate 6, first bearing supports 7, a slider supporting plate 8, a guiding rail supporting plate 9, a torque sensor mounting plate 10, a motor 11, a driving shaft 12, a driven shaft 13, a transmission belt 14, a first synchronous wheel 15, a second synchronous wheel 16, a torque sensor body 17, a coupling 18, a main rotating wheel 19, a driven rotating wheel 20, a left mercury slip ring 21, a right mercury slip ring 22, a first insulating column 23, a tension adjusting mechanism 24, a flexible rolling electrical contact component 25, an upper force sensor body 26, a lower force sensor body 27, an upper insulating roller 28, a lower insulating roller 29, a spacing adjustment mechanism 30, second bearing supports 31, and a second insulating column 32.

One side of a top of base plate 1 is uniformly equipped with the supporting profiles 2, and the fixed supporting plate 6 is mounted on tops of supporting profiles 2. One side of the fixed supporting plate 6 is fixed connected to motor 11, an output end of the motor 11 is connected to the coupling 18.

One end of coupling 18 is fixed to the driving shaft 12, which is rotatably connected to the first bearing supports 7 via bearings. and an end of the driving shaft 12 near the coupling 18 is fitted with the first synchronous wheel 15, while another end of the driving shaft 12 away from the coupling 18 is equipped with the first insulating column 23, the left mercury slip ring 21, and the main rotating wheel 19, with the left mercury slip ring 21 positioned between the first insulating column 23 and the main rotating wheel 19.

The screw assembly 4 is installed on the other side of the top of the base plate 1, which is fixedly connected to the moving supporting plate 5. The top of the moving supporting plate 5 symmetrically holds the second bearing supports 31, which connects driven shaft 13 through bearings. One end of the driven shaft 13 has a second synchronous wheel 16, which is connected to the first synchronous wheel 15 via the transmission belt 14. The torque sensor body 17 is mounted on the driven shaft 13, while the other end of the driven shaft 13 is provided with the second insulating column 32, the right mercury slip ring 22, and the driven rotating wheel 20, with the right mercury slip ring 22 located between the second insulating column 32 and the driven rotating wheel 20. The flexible rolling electrical contact component 25 is rollingly connected between the driven rotating wheel 20 and the main rotating wheel 19, facilitating rolling movement during testing via the rolling contact of the flexible rolling electrical contact component 25.

The first bearing supports 7 are symmetrically mounted on the top of the fixed supporting plate 6, and the torque sensor body 17 is secured on the torque sensor mounting plate 10, the torque sensor mounting plate 10 is installed on the top of the moving supporting plate 5. The top of the fixed supporting plate 6 is provided with the slider supporting plate 8, a top of the slider supporting plate 8 is equipped with a tension adjusting mechanism 24. The tension adjusting mechanism 24 connects with the transmission belt 14. A bottom of the moving supporting plate 5 uniformly holds guiding rail sliders 3, which slide along sliding rails 101 on the top of base plate 1. The top of the fixed supporting plate 6 has a rail supporting plate 9, which contains a spacing adjustment mechanism 30. The top of one side of the spacing adjustment mechanism 30 holds the upper force sensor body 26, while its bottom is equipped with the upper insulating roller 28. The bottom of the other side of the spacing adjustment mechanism 30 is provided with the lower force sensor body 27, the lower force sensor body 27 is provided with the lower insulating roller 29. Both the lower insulating roller 29 and the upper insulating roller 28 are rollingly connected to the flexible rolling electrical contact component 25. These rollers provide feedback on the force conditions to the upper force sensor body 26 and the lower force sensor body 27 through their rolling contact with the flexible rolling electrical contact component 25.

Specifically, during use, the online monitoring software on the host computer is first connected and opened. Then, the upper force sensor body 26 and the lower force sensor body 27 come into contact with the flexible rolling electrical contact component 25. When the flexible rolling electrical contact component 25 is deformed due to the compression from the main rotating wheel 19 and the driven rotating wheel 20, the vertical force is transmitted to the upper force sensor body 26 and the lower force sensor body 27. The upper force sensor body 26 and the lower force sensor body 27 are connected to the dynamic torque sensor body 17, and the signals are amplified by a programmable amplifier and sent to the online monitoring card. After conversion by the online monitoring card, the final data will be displayed in the corresponding program on the host computer.

Next, preloading is conducted, placing the flexible rolling electrical contact component 25 between the main rotating wheel 19 and the driven rotating wheel 20. The screw assembly 4 drives the moving supporting plate 5 to move forward, maintaining a distance of 15 mm to 100 mm between the moving supporting plate 5 and the fixed supporting plate 6, which can be applied for flexible rolling electrical contact component 25 within 100 mm. As the driven rotating wheel 20 moves forward along the moving supporting plate 5, it compresses the flexible rolling electrical contact component 25, and applies a preload force to the flexible rolling electrical contact component 25. When a reading of the force sensor on the host computer reaches the required test value, the operation of the screw assembly 4 is stopped.

Next, a transmission process of the testing device is initiated: the motor 11 provides power, causing the driving shaft 12, the first synchronous wheel 15, the main rotating wheel 19, and the rotor of the left mercury slip ring 21 to rotate. The toothed transmission belt 14 drives the second synchronous wheel 16 on the driven shaft 13 to rotate, while the torque sensor body 17, the driven rotating wheel 20, and the rotor of the right mercury slip ring 22 also rotate with the driven shaft 13. The first synchronous wheel 15 and the second synchronous wheel 16 have a same size, the main rotating wheel 19 and the driven rotating wheel 20 also share a same size, he main rotating wheel 19 and the driven rotating wheel 20 have the same angular and linear velocities and rotate in the same direction. After loading is complete, the flexible rolling electrical contact component 25, constrained by the preload, is positioned between the two rotating wheels. During their rotation, due to friction, the flexible rolling electrical contact component 25 rolls in an opposite direction with the rotating wheels. Unlike the internal and external conductive rings of the rolling slip ring, the structure of the flexible rolling electrical contact component 25 is different. During the transmission process, the position of the torque sensor mounting plate 10 can be adjusted by the screw assembly 4. Additionally, the tension of the toothed transmission belt 14 can be appropriately adjusted by manipulating the adjusting pulley on the adjusting pulley bracket within the tension adjustment mechanism 24.

Next, the torque sensor body 17 connected to the driven shaft 13 collects dynamic torque and uploads the dynamic torque to the host computer. A torque range can be 0 to 3 Nm.

Then, a constant current source is connected at a junction of the main rotating wheel 19, the driven rotating wheel 20, and the left mercury slip ring 21, and the right mercury slip ring 22. A program compatible with power supply allows for the setting of constant current, constant voltage, constant power output, et al., with a power supply capability of up to 4000 kW, a maximum current of 160 A, and a maximum voltage of 32 V. When the flexible rolling electrical contact component 25 begins to roll, the constant current source can be turned on or off to conduct either current-carrying friction or dry friction tests. When the constant current source is activated for current-carrying friction testing, the corresponding program can record the circuit status.

Next, testing the process of testing contact resistance. Measuring the resistance of the rotating wheel, mercury slip rings, and flexible rolling electrical contact component 25 under static conditions without applying current, as well as during rotation. Then, under the applied current load, the voltage between the two mercury slip rings is measured using a contact resistance measuring instrument. By connecting a shunt in the circuit, the current through the circuit can be measured, allowing the overall resistance of the friction circuit to be obtained. Subtracting the individual component resistances yields the contact resistance of the flexible rolling electrical contact testing component. The contact resistance sensor is connected at the junction of the main rotating wheel 19, the driven rotating wheel 20, the left mercury slip ring 21, and the right mercury slip ring 22 to obtain and record the circuit resistance.

Finally, an infrared thermometer is added between the fixed supporting plate 6 and the moving supporting plate 5, and the infrared thermometer is aligned with the flexible rolling electrical contact component 25 to obtain real-time temperature data of the elastic ring. This approach has a wide application range, allowing for simultaneous online monitoring of multiple experimental variables, including friction performance, current-carrying capacity, preload, friction force, and temperature. It eliminates the need to adjust, assemble, and test multiple objects related to the rolling ring structure; instead, only the key electrical contact testing component needs to be adjusted and tested, significantly simplifying the testing structure and methodology while reducing testing costs.

In the description of the present disclosure, it should be noted that unless otherwise specified and limited, the terms "install," "connect," and "link" should be understood in a broad sense. For example, they can refer to fixed connections or detachable connections, or integrated connections; they may be mechanical connections or electrical connections; they can be directly linked or indirectly connected through an intermediary, and may also refer to communication between components within two elements. Those skilled in the art can interpret the specific meanings of these terms in the context of the present disclosure based on the particular circumstances.

The device embodiments described above are merely illustrative. The units described as separate components may or may not be physically distinct. The components displayed as units may or may not be physical units; they can be located in one place or distributed across multiple network units. Depending on actual needs, some or all assemblies can be selected to achieve the objectives of the present embodiment. Those skilled in the art can understand and implement these concepts without requiring creative labor.

Finally, it should be emphasized that the above embodiments are only intended to illustrate the technical solutions of the present disclosure and do not constitute limitations. Although the present disclosure has been described in detail with reference to the aforementioned embodiments, those skilled in the art should understand that modifications can still be made to the technical solutions described in the various embodiments, or some technical features can be equivalently replaced. Such modifications or replacements do not depart from the essence of the technical solutions of the present disclosure.

What is claimed is:

1. A testing device for a current-carrying friction and wear performance of a flexible rolling electrical contact, comprising a base plate, supporting profiles, and guiding rail sliders, and a screw assembly, and a movable supporting plate, and a fixed supporting plate, and first bearing supports, and a slider supporting plate, and a guiding rail supporting plate, and a torque sensor mounting plate, and a motor, and a driving shaft, and a driven shaft, and a transmission belt, and a first synchronous wheel, and a second synchronous wheel, and a torque sensor body, and a coupling, and a main rotating wheel, and a driven rotating wheel, and a left mercury slip ring, and a right mercury slip ring, and a first insulating column, and a tension adjustment mechanism, and a flexible rolling electrical contact component, and an upper force sensor body, and a lower force sensor body, and an upper insulating roller, and a lower insulating roller, and a spacing adjustment mechanism, and second bearing supports, and a second insulating column; wherein, the supporting profiles are arranged on a side of a top of the base plate, and the fixed supporting plate is mounted on tops of the supporting profiles; and a side of the fixed supporting plate is fixedly connected to a motor, and an output end of the motor is equipped with the coupling; and an end of the coupling is fixed to the driving shaft, which is rotatably connected to the first bearing supports via bearings; and an end of the driving shaft near the coupling is fitted with the first synchronous wheel, while another end of the driving shaft away from the coupling is equipped with the first insulating column, the left mercury slip ring, and the main rotating wheel respectively, with the left mercury slip ring located between the first insulating column and the main rotating wheel; and the screw assembly is installed on another side of the top of the base plate, which is fixedly connected to the movable supporting plate; and the second bearing supports are symmetrically provided on a top of the movable supporting plate, through which the driven shaft is connected via bearings; and an end of the driven shaft is fitted with the second synchronous wheel, which is connected to the first synchronous wheel via the transmission belt; and the torque sensor body is mounted on the driven shaft, while another end of the driven shaft is provided with the second insulating column, the right mercury slip ring, and the driven rotating wheel respectively, with the right mercury slip ring is positioned between the second insulating column and the driven rotating wheel; and the flexible rolling electrical contact component is provided between the driven rotating wheel and the main rotating wheel; and a top of the fixed supporting plate is provided with the slider supporting plate, a top of the slider supporting plate is provided with the tension adjustment mechanism, and the tension adjustment mechanism is connected to the transmission belt; and a bottom of the movable supporting plate is equipped with the guiding rail sliders, which is connected to sliding rails on the top of the base plate for sliding movement; and the guiding rail supporting plate is provided on the top of the fixed supporting plate, and the spacing adjustment mechanism is provided on the guiding rail supporting plate; and a top of a side of the spacing adjustment mechanism is fitted with the upper force sensor body, with the upper insulating roller located at a bottom of the upper force sensor body; and a bottom of another side of the spacing adjustment mechanism houses the lower force sensor body, and the lower force sensor body is equipped with the lower insulating roller.

2. The testing device of claim 1, wherein, the first bearing supports are symmetrically installed on the top of the fixed supporting plate.

3. The testing device of claim 1, wherein, the torque sensor body is secured on the torque sensor mounting plate, and the torque sensor mounting plate is installed on the top of the movable supporting plate.

4. The testing device of claim 1, wherein, the lower insulating roller and the upper insulating roller are both rolling-connected to the flexible rolling electrical contact component.

\* \* \* \* \*